Patented Mar. 14, 1939

2,150,147

UNITED STATES PATENT OFFICE 2,150,147

COMPOSITION OF MATTER AND METHOD OF MAKING

Albert Henry Bowen and Theodore Williams Dike, Seattle, Wash., assignors to I. F. Laucks, Inc., Seattle, Wash., a corporation of Washington No Drawing. Application August 7, 1935, Serial No. 35,220

6 Claims. (Cl. 260—3)

The present invention relates to a class of new compounds of a thermo-setting resinous character resulting from combination between zinc chloride, a urea and formaldehyde, and to processes for making and using them, this application being a continuation-in-part of our application Serial No. 728,679, filed June 2, 1934, as a continuation-in-part of our application Serial No. 666,930, filed April 19, 1933, now issued as Patent No. 1,992,180, in which there is claimed the process and product making possible a clear stable liquid with a large combined zinc chloride content, i. e., 6% and above in relation to the urea content.

To the accomplishment of the foregoing and related ends, the invention, then, comprises the features thereinafter fully described, and particularly pointed out in the claims, the following description setting forth in detail certain illustrative embodiments of the invention, these being indicative however, of but a few of the various ways in which the principle of the invention may be employed.

As materials we may use zinc chloride either fused or hydrated, urea either agricultural or refined as well as other ureas such as thiourea, and formaldehyde either as commercial 37% solution, i. e., formalin or equivalent polymerized forms. Commercial chemicals are usually satisfactory and only in special cases is it necessary to use purified materials. The reactions are carried out in aqueous solution as when commercial formalin is used to provide the formaldehyde. Under certain circumstances we may use additional modifying agents which may or may not enter into combination with the other elements.

The syrupy liquid initial reaction products have certain characteristics. They are resinous and thermo-setting and may also be converted or hardened by rendering them more acid when in solution or suspension in a liquid medium. They are non-alkaline, having generally an acidity of between pH 4.0 and pH 6.0. Their stability generally varies more or less directly with the pH on the principle that the greater the hydrogen ion concentration the less the stability. As is to be expected due to the greater chemical activity in a liquid medium, the liquors are far less stable than the solid forms. Liquid products having a low content of zinc chloride, however, can be made of great stability in accordance with this invention. The liquors in a reasonably pure state are colorless and stainless and compatible with both water soluble plasticizers such as the glycols and with acid soluble dyes of low or moderate acidity. As compared to either urea-formaldehyde or phenol-formaldehyde resins, these zinc chloride-urea-formaldehyde resins have the important advantage of being much faster setting, and in most cases set in from one-half to one-eighth the time with the same heat treatment. As compared to the corresponding urea-formaldehyde resins, all the various zinc chloride-urea-formaldehyde resins have very superior adhesive properties, which combined with their greater speed of conversion makes them useful in a variety of commercial fields.

The converted zinc chloride-urea-formaldehyde resins are fast to light, infusible, insoluble in cold water, and much stronger than wood. When made with thiourea in place of part of the urea or with sulphur combined in the resin molecule by other convenient means, additional values in various properties are obtained. The converted product also has remarkable resistance to abrasion either under dry or wet conditions. This feature is of great value in some applications, particularly in connection with paints and paper sizing. It appears to be due to the combined zinc chloride and increases in direct proportion to the zinc chloride content of the resin up to the upper limit of combination.

A great variety of liquors may be made with wide variation in zinc chloride content and urea-formaldehyde ratio. By the methods of the present invention the zinc chloride content may be lowered all the way to 1% of the urea and a very stable, clear liquor produced. This ability to make liquors with low ratios of zinc chloride is an advance over the methods disclosed in our application Serial No. 666,930, now issued as Patent No. 1,992,180 wherein we made the statement, page 2 of the patent, column 1, lines 73-75, and column 2, lines 1-4, "If the 50% ratio of zinc chloride to urea is reduced to 25% the time required to complete the reaction at a given temperature is more than doubled. At a 6% ratio only cloudy liquors are obtained and their stability is greatly reduced. Below that ratio stable liquids cannot be obtained." Also in the same patent, page 1, column 1, lines 42-48 we stated "The temperature maintained during reaction is important, useful intermediates being obtained by reacting below 212° F., usually considerably below and in some cases at room temperature. Boiling the mixture forms an irreversible gel."

Such limitations are removed by following the methods of the present disclosure. In general we find that as the zinc chloride content is reduced a progressive necessity arises for counteracting the influence of the acidity originally present in or subsequently developed from the formalin during the reaction, together with a parallel necessity for increasing the duration and/or intensity of the heat treatment. This we accomplish by the various procedures below set forth. In other words, the greater the reduction of zinc chloride below 6 parts, the greater becomes the need of counteracting acidity.

We find that by decreasing the proportion of urea to formalin the stability with low zinc chloride content is improved and the tendency to form a precipitate is greatly reduced. When reducing the urea content to increase the stability we find that the displaced urea may frequently be advantageously replaced with sucrose. We have found that the substitution of the sucrose for part of the urea adds greatly to the stability of the liquor, improves the adhesive properties and adds to the strength and toughness of the resin after conversion. Other sugars, such as glucose, dextrose and the like may be used in place of the sucrose. Starches may also be substituted as well as agar and gum arabic, also glycerin and glycols. In general, we find that in the formula a substitution of up to 15% of the urea with these substances is permissible without detriment to the product when used as an adhesive. These materials appear to combine chemically with the product for they no longer respond to the usual tests. All of them have plasticizing effects in greater or less degree. In many cases this substitution actually causes a further increase in stability without imparting any objectionable characteristics to the final product and with the great advantage of maintaining a high solid content. In many cases we prefer to use glucose which due to its low cost effects an important economy. By following these general methods clear, stable liquors of great usefulness may be readily made which could not be made by the method of Application Serial No. 666,930, now issued as Patent No. 1,992,180, with ratios of zinc chloride below 6 parts to each 100 parts urea.

The following example is illustrative of the invention, it being understood that the sugar may or may not be used:

Using a closed top cooking vessel provided with a reflux condenser and hollow stirring mechanism which can be heated or cooled, 1100 pounds of formalin are treated with a small amount of caustic soda till the acidity is brought to about pH 6.0. 8 pounds of fused zinc chloride are then dissolved in the formalin and the mixture run into the cooker. 320 pounds of agricultural urea and 80 pounds of glucose are then added, the stirring mechanism started, the reflux condenser put in operation and the mixture rapidly brought to a boil by running steam through the coils of the agitator. The material is boiled under the reflux for about four hours, then cooled rapidly to 70° and run out into containers.

The product is a clear liquor of moderate viscosity and complete solubility in cold water in all proportions. The zinc chloride content is 2½% in relation to the urea. A similar liquor of somewhat less stability and lower solid content may be made with the sugar omitted. Any of the other materials listed above as substitutes for sugar may also be used. If the step of partly neutralizing the formalin is omitted a persistent precipitate appears which is heavy and settles out of the product. The water solubility of the product and its stability are both adversely affected.

Instead of the standard formalin containing about 10% of methyl alcohol as a stabilizer and with a pH of around 3.0, formalin stabilized with 6% of urea and with only about 0.5% of methanol content may be used. This formalin already has very low acidity with a pH of about 6.0 and in that case the neutralization is not required but of course a corresponding reduction is made in the amount of urea to be added.

This liquor will keep for a number of months. It may be spray-dried to produce a completely or partly water soluble powder. This liquor is valuable for impregnating, sizing, and similar uses either in the original form or in the form of the more convenient and stable powder.

Other modes of applying the principle of the invention may be employed instead of these herein explained, change being made as regards the details disclosed, provided the features stated in any of the following claims, or the equivalent of such, be employed.

We therefore particularly point out and distinctly claim as our invention:

1. A process of forming substantially clear stable liquid condensation products which comprises reacting zinc chloride, urea and formalin, the zinc chloride being present in amount below six parts thereof to each one hundred parts of urea, and counteracting the acidity of the formalin before the reaction in accordance with the extent to which the zinc chloride is present below six parts thereof to each one hundred parts of urea.

2. A process of forming substantially clear stable liquid condensation products which comprises reacting zinc chloride, urea and formalin, the zinc chloride being present in amount below six parts thereof to each one hundred parts of urea, and counteracting the acidity of the formalin during the reaction in accordance with the extent to which the zinc chloride is present below six parts thereof to each one hundred parts of urea by including in the formalin initially urea in amount sufficient to increase the pH to about pH 6.

3. A process of forming substantially clear stable liquid condensation products which comprises reacting zinc chloride, urea and formalin, the zinc chloride being present in amount below six parts thereof to each one hundred parts of urea and including an agent in the formalin before the reaction effective to increase the pH of the formalin to an extent sufficient to compensate for the deficiency of zinc chloride content below six parts thereof to each one hundred parts of urea.

4. A process of forming substantially clear stable liquid condensation products which comprises reacting zinc chloride, urea and formalin, the zinc chloride being present in amount below six parts thereof to each one hundred parts of urea, the formalin having initially a pH adjusted in accordance with the ratio of zinc chloride content to the urea content.

5. A process of forming substantially clear stable liquid condensation products which comprises reacting zinc chloride, urea and formalin, the zinc chloride being present in amount below six parts thereof to each one hundred parts of urea, and counteracting the acidity in accordance with the extent to which the zinc chloride is present below six parts thereof to each one hundred parts of urea by including a carbohydrate selected from a group consisting of glucose, dextrose and sucrose in the ratio of the order of substantially one part thereof to substantially four parts urea when the urea is present in an amount slightly less than one part to each three parts of formalin.

6. As a new article of manufacture, a substantially clear stable liquid condensation product comprising the reaction product of below six parts of zinc chloride with each one hundred parts of urea, and formalin, the acidity originally present in or subsequently developed during the reaction being substantially counteracted.

ALBERT HENRY BOWEN.
THEODORE WILLIAMS DIKE.